US010839328B2

(12) United States Patent
Cheng et al.

(10) Patent No.: US 10,839,328 B2
(45) Date of Patent: Nov. 17, 2020

(54) METHOD AND SYSTEM FOR RISK MONITORING IN ONLINE BUSINESS

(75) Inventors: Li Cheng, Hangzhou (CN); Lei Li, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 1745 days.

(21) Appl. No.: 12/294,901

(22) PCT Filed: Mar. 23, 2007

(86) PCT No.: PCT/CN2007/000943
§ 371 (c)(1),
(2), (4) Date: Mar. 23, 2010

(87) PCT Pub. No.: WO2007/109987
PCT Pub. Date: Oct. 4, 2007

(65) Prior Publication Data
US 2010/0174570 A1 Jul. 8, 2010

(30) Foreign Application Priority Data
Mar. 28, 2006 (CN) .......................... 2006 1 0066301

(51) Int. Cl.
*G06Q 10/00* (2012.01)
*G06Q 10/06* (2012.01)
(Continued)

(52) U.S. Cl.
CPC ..... *G06Q 10/0635* (2013.01); *G06Q 30/0185* (2013.01); *G06Q 30/02* (2013.01)

(58) Field of Classification Search
CPC ......... G06Q 10/06375; G06Q 10/0635; G06Q 10/06316
(Continued)

(56) References Cited

U.S. PATENT DOCUMENTS 7,263,506 B2 * 8/2007 Lee ........................ G06Q 20/04
705/318
7,337,119 B1 * 2/2008 Geschwender ........ G06Q 20/04
705/44
(Continued)

FOREIGN PATENT DOCUMENTS

CN            1356611           7/2002
CN            1639719 A       7/2005
(Continued)

OTHER PUBLICATIONS

Dhanapal, Credit Card Fraud Detection Using Decision Tree for Tracing Email and IP, 2012, IJCSI International Journal of Computer Science Issues, vol. 9, Issue 5, No. 2, 1694-0814 (Year: 2012).*

(Continued)

*Primary Examiner* — Hafiz A Kassim
*Assistant Examiner* — Zahra Elkassabgi
(74) *Attorney, Agent, or Firm* — Lee & Hayes, P.C.

(57) ABSTRACT

A method of risk monitoring in online business is disclosed. The method captures parameters of a user request and business data of processing the request by a business processing system; packs the parameters and the business data into an event object; analyzes the event object according to risk monitoring rules; and generates a risk record if a risk is determined to exist in an operation event that produces the business data. The method further determines a risk processing mode according to the risk record and a risk processing configuration, and processes the risk of the operation event in the risk processing mode. Also disclosed is a system for risk monitoring in online business.

13 Claims, 5 Drawing Sheets

(51) Int. Cl.
*G06Q 30/02* (2012.01)
*G06Q 30/00* (2012.01)

(58) Field of Classification Search
USPC ...................................................... 705/1–14
See application file for complete search history.

(56) References Cited

U.S. PATENT DOCUMENTS

| | | | |
|---|---|---|---|
| 7,426,512 B1* | 9/2008 | Ben-Natan | |
| 7,660,702 B2* | 2/2010 | Blight ................. | G06F 11/3495 |
| | | | 702/186 |
| 7,686,214 B1* | 3/2010 | Shao et al. ..................... | 235/380 |
| 7,698,148 B2* | 4/2010 | Lavu et al. ..................... | 705/1.1 |
| 2004/0148256 A1* | 7/2004 | Bramnick et al. .............. | 705/40 |
| 2004/0210500 A1* | 10/2004 | Sobel ..................... | G06Q 40/00 |
| | | | 705/35 |
| 2005/0060213 A1* | 3/2005 | Lavu .................. | G06Q 30/0283 |
| | | | 705/1.1 |
| 2005/0256798 A1* | 11/2005 | Herter et al. ................... | 705/37 |
| 2006/0026044 A1* | 2/2006 | Smith, II .......................... | 705/4 |
| 2006/0064374 A1* | 3/2006 | Helsper et al. ................. | 705/39 |
| 2012/0296848 A1* | 11/2012 | Villacorta ............ | G06Q 40/025 |
| | | | 705/36 R |

FOREIGN PATENT DOCUMENTS

| | | |
|---|---|---|
| CN | 1831864 A | 9/2006 |
| CN | 1976320 A | 6/2007 |
| CN | 1998013 A | 7/2007 |
| JP | 2005509196 | 4/2005 |
| JP | 2007523426 | 8/2007 |
| JP | 2008507757 | 3/2008 |
| WO | WO2004023266 | 3/2004 |
| WO | WO2005086057 | 9/2005 |
| WO | WO2005098626 | 10/2005 |
| WO | WO2006019513 | 2/2006 |

OTHER PUBLICATIONS

The European Office Action dated Sep. 13, 2011 for European patent application No. 07720517.7, a counterpart foreign application of U.S. Appl. No. 12/294,901, 5 pages.
The Chinese Office Action dated Mar. 18, 2010 for Chinese patent application No. 200610066301X a counterpart foreign application of U.S. Appl. No. 12/294,901, 5 pages.
The Chinese Office Action dated Jun. 26, 2009 for Chinese patent application No. 200610066301X a counterpart foreign application of U.S. Appl. No. 12/294,901, 5 pages.
Translated the Japanese Office Action dated Sep. 21, 2012 for Japanese patent application No. 2009-501817, a counterpart foreiign application of U.S. Appl. No. 12/294,901, 11 pages.
Translated the Japanese Office Action dated Feb. 10, 2012 for Japanese patent application No. 2009-501817, a counterpart foreign application of U.S. Appl. No. 12/294,901, 8 pages.
Translated the Japanese Office Action dated May 31, 2013 for Japanese patent application No. 2009-501817, a counterpart foreign application of U.S. Appl. No. 12/294,901, 4 pages.
The Chinese Office Action dated Mar. 18, 2010 for Chinese patent application No. 200610066301X a counterpart foreign application of U.S. Appl. No. 12/294,901, 11 pages.
The Chinese Office Action dated Jun. 26, 2009 for Chinese patent application No. 200610066301X a counterpart foreign application of U.S. Appl. No. 12/294,901, 8 pages.
The European Office Action dated Apr. 13, 2011 for European patent application No. 07720517.7, a counterpart foreign application of U.S. Appl. No. 12/294,901, 5 pages.
PCT Writtent Opionon of the International Searching Authoriity for PCT patent application No. PCT/CN2007/000943 dated Jul. 5, 2007, 4 pages.

* cited by examiner

US 10,839,328 B2

METHOD AND SYSTEM FOR RISK MONITORING IN ONLINE BUSINESS

This application is a national stage application of an international patent application No. PCT/CN2007/000943, filed Mar. 23, 2007, which claims priority from Chinese patent application No. 200610066301.X, filed Mar. 28, 2006, entitled "METHOD AND SYSTEM FOR MONITORING RISKS IN ONLINE BUSINESS", which applications are hereby incorporated in their entirety by reference.

TECHNICAL FIELD

The present disclosure relates to the fields of communication and computer technologies, and particularly to methods and systems for risk monitoring in online business.

BACKGROUND ART

With the rapid development of Internet, various types of online businesses continue to emerge. Examples of these Internet-based online business transactions are online banking, online payment and online shopping. Today people have accepted and got used to performing different business activities on the Internet.

Since Internet is an open network, anyone anywhere in the world can conveniently connect to the Internet. Internet provides convenience to people's lives but at the same time poses risks. In the recent years especially, along with rapid development of electronic commerce, network-based financial crimes and online frauds occur frequently and have become a focus of people's concern. As a result, consumers may not be able to use the online services with peace if there is no efficient risk monitoring and control in the online business processing systems, especially in those transactions involving transferring of funds.

In order to monitor its business processing systems, the current online business processing systems embed (i.e., hard code) monitoring function modules into a transaction processing function module of the online business processing system to perform risk analysis and processing. The underlying realization principle is to have the transaction processing module transmit business data to a monitoring function module, and wait until the monitoring function module has returned a result to perform the remaining business transactions.

However, even though the existing technologies can perform certain risk monitoring, they affect the speed and performance of the business transaction processing. This is because the risk analysis, the risk processing and the business transaction processing need to be synchronized, and the business transaction processing has to wait until the risk analysis and the risk processing have finished to return a result. Moreover, since hard coding is used to implement risk analysis and processing, the programming codes for transaction processing and monitoring function have to be modified if the rules for risk analysis are changed. Therefore, the expansibility is poor. Furthermore, since risk analysis and risk processing are placed together with the processing of all kinds of business transactions, there is not a unified management system to effectively manage the rules of risk monitoring for all different business processing systems. This poses difficulties for managing the risk monitoring of the business processing systems as a whole.

DESCRIPTION OF THE DISCLOSURE

The present disclosure provides a method and a system for risk monitoring in online business to increase the stability and efficiency of business processing systems.

The present disclosure provides a technical scheme described as follows.

A method for risk monitoring in online business includes the following steps:

capturing parameters of a user request and business data of processing the user request by a business processing system, and packing the parameters of the user request and the business data into an event object;

analyzing the event object according to risk monitoring rules, and generating a risk record if a risk is determined to exist in an operation event that produces the business data; and determining a risk processing mode according to the risk record and a risk processing configuration, and processing the risk of the operation event according to the risk processing mode.

An interception method may be used for capturing the parameters of the user request and the business data from the business processing system.

The method may further include: saving the event object as a historical event upon determining based on a property of the operation event in the event object that the operation event is able to provide a basis of risk determination for other operation events.

The analysis of the event object using the risk monitoring rules may include: searching for related historical events; creating an event context using the related historical events found; and analyzing the event object in the event context.

In analyzing the event object, the event object is sent to a rule engine which is used for analyzing the risk according to the risk monitoring rules.

Collecting the event object from the business processing system and analyzing the event object are performed using an asynchronous mechanism, and/or analyzing the event object and processing the risk are performed using an asynchronous mechanism.

The method may further include: sending the event object to a monitored event message queue, and fetching the event object to be analyzed when the event object is detected in the event message queue; and/or sending the risk record generated by analyzing the event object to a monitored risk message queue, and upon detecting the risk record in the risk message queue, fetching the risk record for processing the risk.

The risk processing mode may be either performing automatic processing or providing warning notification. If the automatic processing mode is adopted, the method may further determine an executing object for processing the risk, and send the risk record to the executing object.

A system of risk monitoring for online services includes:

a collecting device, used for capturing parameters of a user request and business of processing the user request by a business processing system, and for packing the parameters of the user request and the business data into an event object;

a risk analyzing device, used for analyzing the event object using preset risk monitoring rules and generating a risk record if a risk is determined to exist in an operation event that produces the business data; and a risk processing device, used for determining a risk processing mode according to the risk record and a risk processing configuration, and for processing the risk of the operation event according to the risk processing mode.

The system may further include a storage device for storing the risk monitoring rules.

The risk analyzing device may include: an event monitor, used for monitoring an event message queue storing the event object, and for fetching the event object to trigger analyzing thereof upon detecting the event object in the event message queue; and an event analyzer, used for analyzing the event object and generating a risk record.

The event analyzer may include a rule engine for calling the risk monitoring rules for analyzing the risk of the event object.

The risk processing device may include a risk monitor, used for monitoring a risk message queue storing the risk records, and for obtaining the risk record upon detecting the risk record in the risk message queue; a risk analyzer, used for determining a risk processing mode according to a property of the risk record and the risk processing configuration; and a risk processor, used for processing the risk according to the risk processing mode.

There may be one or more risk processors, each risk processor being used for implementing a separate risk processing function. The risk analyzer selects based on the risk record one of the risk processors to process the risk.

By separating the risk monitoring function from the business processing function and adopting an asynchronous mechanism, the present disclosure can greatly improve the performance of the system. Using risk monitoring system to provide a unified monitoring for all business processing systems, a preferred embodiment allows easy management and control. Furthermore, since an interception method is adopted for collecting event objects, addition of a risk monitoring function to the original system can be made without modifying the original business processing codes. Therefore the original transaction logic is not affected. Asynchronous mechanism can be applied between event analysis and business processing. After completing the processing, the business processing system can return the processing result to the user without waiting for the event analysis to finish. As such, the risk monitoring system will not affect the processing speed of the business processing system. Furthermore, since the rule engine instead of hard coding is used for implementing the event analysis, any addition of new rules or modifications to existing rules can be achieved simply by editing the rule configuration without requiring code modification, compilation or re-distribution. This results in good expansibility for the risk monitoring rules.

EXEMPLARY EMBODIMENTS

The present disclosure separates online business processing function from risk monitoring function, and allows risk monitoring system to capture parameters of the user requests in every business processing system and the business data of processing the user requests by each business processing system. It then determines based on analyzing the captured data a corresponding risk processing applied when a risk is found in the business operation.

In an online business processing system, after a user has performed an operation such as conducting a trade or making a payment, normally a certain period of time needs to pass before the operation can come into effect. For example, the system may prescribe that an operation becomes effective after a day (e.g., the second day after the operation). This leaves sufficient time for the risk monitoring system to process risk. For better performance, the business processing system and the risk monitoring system can adopt asynchronous processing mechanism. In other words, after processing the operation, the business processing system does not need to wait for the returned result from the risk monitoring system. This improves the stability and efficiency of the business processing system.

Figure 1:
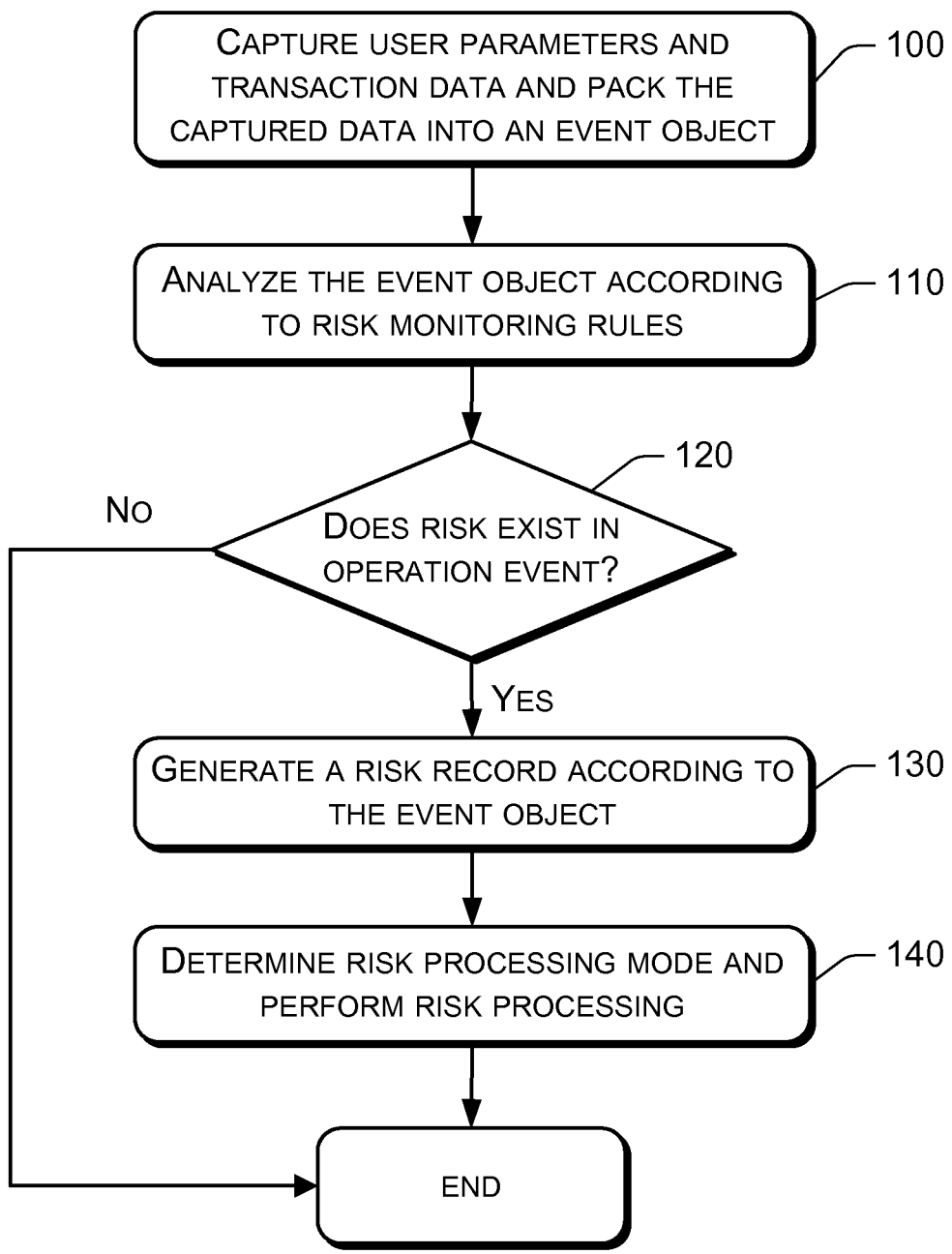
FIG. 1 shows a flow chart of risk monitoring in accordance with the exemplary embodiment of the present disclosure.

FIG. 1 shows a process of risk monitoring of a business operation. The process includes the following steps:

At Step 100, a risk monitoring system captures parameters of a user request and business data of processing the user request by a business processing system. The risk monitoring system then packs these data into an event object according to a predefined event model.

The event model may include information such as a user ID, a time of the occurrence of the event, a customer terminal IP (Internet Protocol) address, a customer terminal MAC (Medium Access Control) address, a server address, an operation type, an operation object ID and operation content.

At Step 110, the risk monitoring system analyzes the event object according to risk monitoring rules.

Step 120 determines based on a result of the analysis if a risk exists in the associated operation event. If a risk exists, the process continues to Step 130. Otherwise, the monitoring of this business operation is terminated.

Step 130 generates a risk record based on related information in the event object.

At Step 140, the risk monitoring system processes the risk of the operation event based on the risk record and a risk processing configuration.

Figure 2:
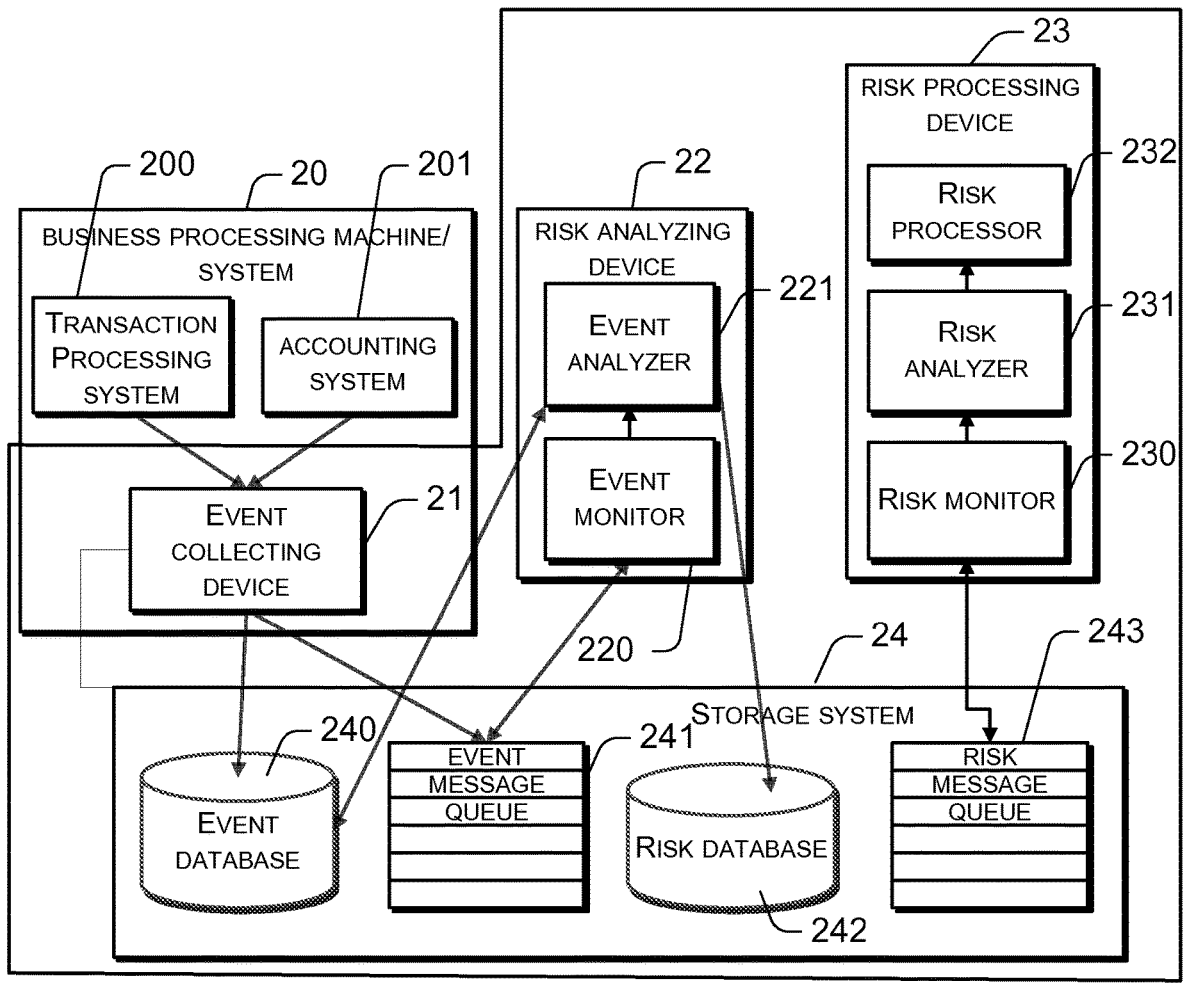
FIG. 2 shows a structural schematic diagram of a risk monitoring system in accordance with the exemplary embodiment of the present disclosure.

FIG. 2 shows a preferred architecture of the risk monitoring system which includes: an event collecting device 21, a risk analyzing device 22 and a risk processing device 23. Business processing machine 20 in FIG. 2 is a server running a business processing system. The business processing system may include a transaction processing system 200, an accounting system 201, etc.

The event collecting device 21 is used for capturing parameters of a user request and business data of processing the user request by the business processing system, and for packing the parameters of the user request and the business data into an event object. Furthermore, upon collecting an event object, the event collecting device 21 determines whether there is a need to save the event object based on the event's property (such as whether it is a fund withdrawal event or a recharging event). That is, the event collecting device determines if the event will provide a basis of risk determination for other future events. If so, the event object is saved. Otherwise, event object is not saved. For instance, a trade operation can probably provide a basis of risk determination for a future fund withdrawal operation. Therefore, this event operation needs to be saved.

The risk analyzing device 22 is used to analyze according to risk monitoring rules the event object collected by the event collecting device 21. Upon determining that the operation event incurred by the business processing system in response to the user request has a risk, the risk analyzing device 22 generates a risk record. The risk record may include such information as the time, the address, and the subject of the risk and the business data. All risk monitoring rules are organized into a rule library for the use by the event analyzing system 22. As such, there is no need to modify other parts and no impact on the functions of other parts when the risk monitoring rules are modified.

The risk processing device 23 is used for determining a risk processing mode according to a risk processing configuration and the risk record, and for processing the risk accordingly. The risk processing mode can be automatic processing, but can also be manual processing (i.e., having an administrative person process the risk after giving a warning notification).

Furthermore, a storage device 24 of the risk monitoring system includes, besides storing the risk monitoring rules, an event database 240, an event message queue 241, a risk database 242, and a risk message queue 243. The event database 240 can be any commonly used relational database and is used for storing event objects which provide bases of risk determination for other events. The event message queue 241 can be any commonly used message middleware. The event message queue 241 is used for storing the event objects and completing asynchronous delivery of the event objects in the risk monitoring system. The risk database 242 can be any commonly used relational database and is used to store risk records for enquiry. The risk message queue 243 can be any commonly used message middleware. The risk message queue 243 is used for storing the risk records and completing asynchronous delivery of the risk records in the risk monitoring system.

The risk analyzing device 22 further includes an event monitor 220 and an event analyzer 221. The event monitor 220 is used for monitoring the event message queue 241. Upon detecting a new event object entering into the queue, the event monitor 220 fetches this event object and transmits the event object to the event analyzer 221. At the same time, the event message queue 241 will automatically delete this event object from its content. The event analyzer 221 places the event object as a "fact" into a rule engine. The rule engine then uses all related risk monitoring rules to analyze this event and obtains an analysis result. If the event violates one or more risk monitoring rules, there exists a risk in the event. The rule engine gathers all risk monitoring rules that the event has violated. The event analyzer 221 generates a risk record (e.g., a risk model recording such information as the time, the address and the subject of the risk, and the business data) based on the information of the event object and all risk monitoring rules being violated. The event analyzer 221 then saves this risk record into the risk database 242 and at the same time sends the risk record to the risk message queue 243. Since any event could be related to other events, the event analyzer 221 needs to search the event database 240 during the analysis process for any historical events that are related to the event. Upon finding such related historical events, the event analyzer 221 constructs an event context and analyzes the event object within this event context.

The risk processing device 23 further includes a risk monitor 230, a risk analyzer 231 and a risk processor 232. The risk monitor 230 is used for monitoring the risk message queue 243. Upon detecting a new risk record entering into the queue, the risk monitor 230 fetches this new risk record and transmits the risk record to the risk analyzer 231. At the same time, the risk message queue 243 automatically deletes this risk record from its content. Based on the risk processing configuration and the properties of the risk record, the risk analyzer 231 determines whether the risk of the operation event should be processed automatically, or manually by an administrative person. There can be one or more than one risk processor 232. Each risk processor 232 has a separate risk processing function. Upon determining that automatic processing is to be used, the risk analyzer 231 selects one of the risk processors 232 based on the properties of the risk record, and then sends the risk record to the selected risk processor 232. The risk processor 232 completes the risk processing accordingly (e.g., suspends a related account).

In order to avoid any impact on the original business processing system, the event collecting device 21 adopts a method of interceptor technology to capture the parameters of the user request and business data from the business processing system. Specifically, the request message is intercepted (i.e., a copy of the data is made) on a necessary path for the user request to enter the business processing system (calling a method), while the transaction processing result is intercepted (i.e., a copy of the data is made) on the necessary path for the returned processing result (return of the method). Using interceptor technology allows a transparent interception of data exchange between systems. Compared with traditional technology of active notification, using interception technology releases the business processing system of the need for sending business data. Furthermore the interceptor is independent and separated from the business processing system, and so the normal operation of the business processing system is not affected.

The event collecting device 21 sends the collected event object to the event message queue 241, while the event monitor 220 monitors the event message queue 241 to obtain the new event object. This achieves asynchronous processing between the business processing system and the risk monitoring system. At the same time, asynchronous processing between event collection and event analysis in the risk monitoring system can also be achieved. Similarly, the event analyzer 221 sends the generated risk record to the risk message queue 243 while the risk monitor 230 monitors the risk message queue 243 to obtain the new risk record, achieving asynchronous processing between risk analyzing device 22 and risk processing device 23. Using message queue mechanism to attain asynchronous processing between the systems not only improves the efficiency of event analysis, but also reduces the degree of coupling between the systems, thereby achieving better expansibility.

Figure 3:
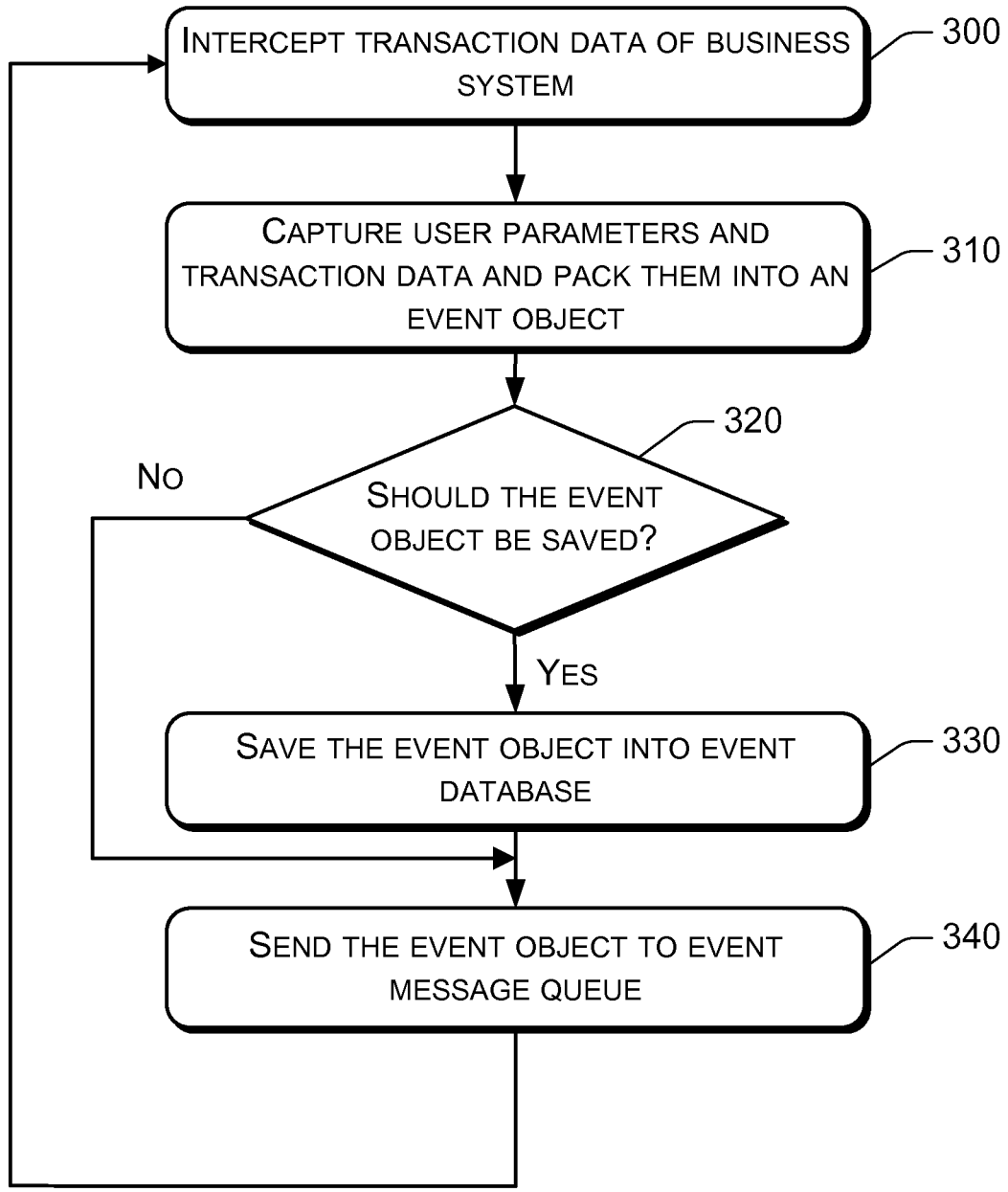
FIG. 3 shows a flow chart of collecting an event object in accordance with the exemplary embodiment of the present disclosure.

FIG. 3 shows a flow chart of event object collection, which is described as follows:

At Step 300, the event collecting device 21 intercepts a transaction of a business processing system.

At Step 310, the event collecting device 21 intercepts parameters of a user request and business data created by an operation event (e.g., processing of a business transaction) of the business processing system, and packs these data into an event object.

Step 320 determines based on the property of the event whether the event object needs to be saved. If yes, the process continues to Step 330. Otherwise, the process proceeds to Step 340.

At Step 330, the event collecting device 21 saves the event object into the event database 240.

At Step 340, the event collecting device 21 sends the event object to the event message queue 241. The process then returns to Step 300.

Figure 4:
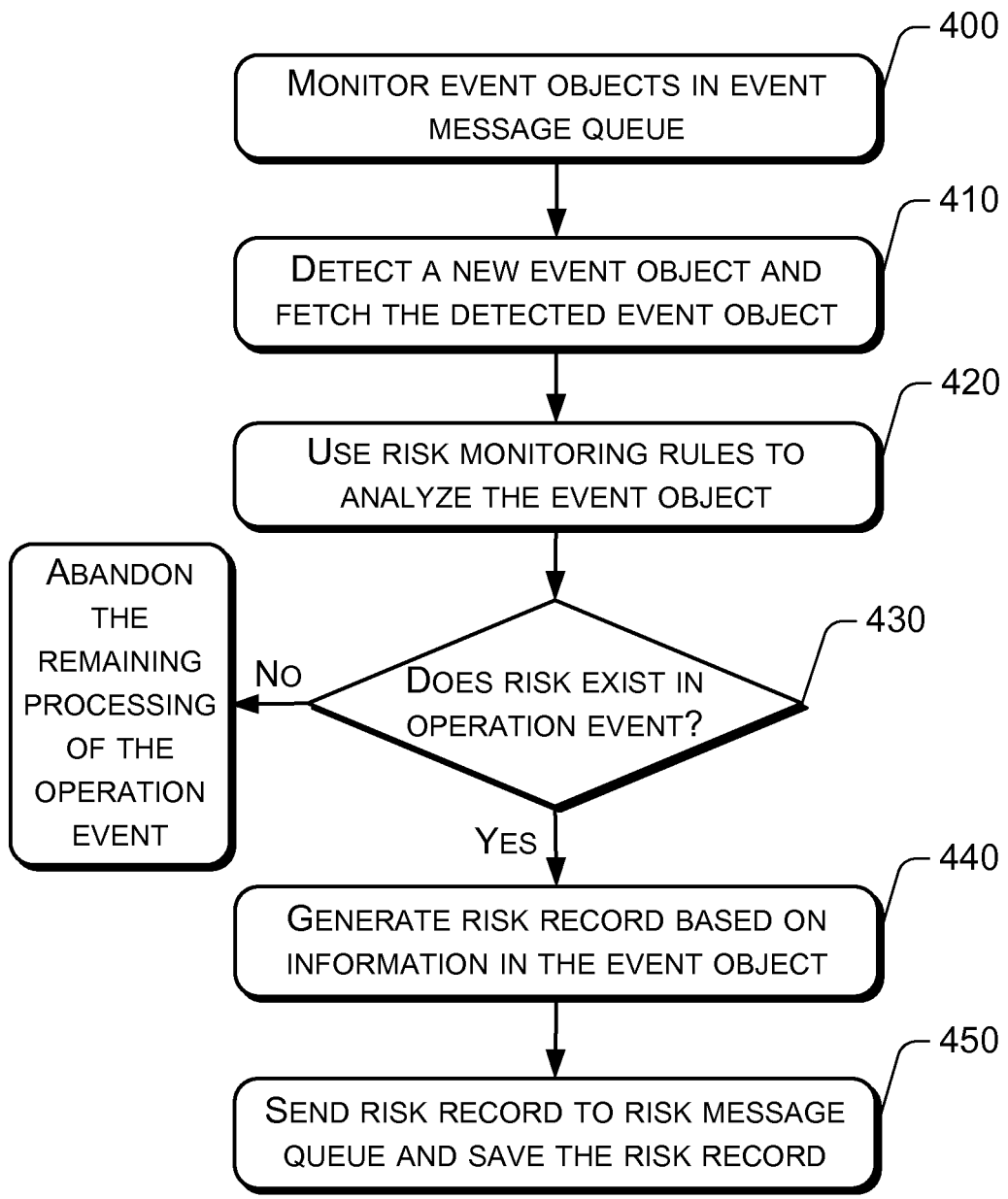
FIG. 4 shows a flow chart of analyzing an event object in accordance with the exemplary embodiment of the present disclosure.

FIG. 4 shows a flow chart of event object analysis, which is described as follows:

At Step 400, the event monitor 220 monitors the event message queue 241.

At Step 410, upon detecting a new event object entering into the event message queue 241, the event monitor fetches the event object and sends the event object to the event analyzer 221. The event message queue 241 then deletes the event object.

At Step 420, the event analyzer 221 sends the event object to a rule engine. The rule engine uses risk monitoring rules to analyze the event object and obtains an analysis result.

At Step 430, the event analyzer 221 determines based on the risk monitoring rules whether there exists a risk in the operation event. If yes, the process continues to Step 440. Otherwise, the process abandons the subsequent processing of the operation event.

At Step 440, the event analyzer 221 generates a risk record based on the information in the event object.

At Step 450, the event analyzer 221 sends the risk record to the risk message queue 243 and saves the risk record into the risk database 242.

Figure 5:
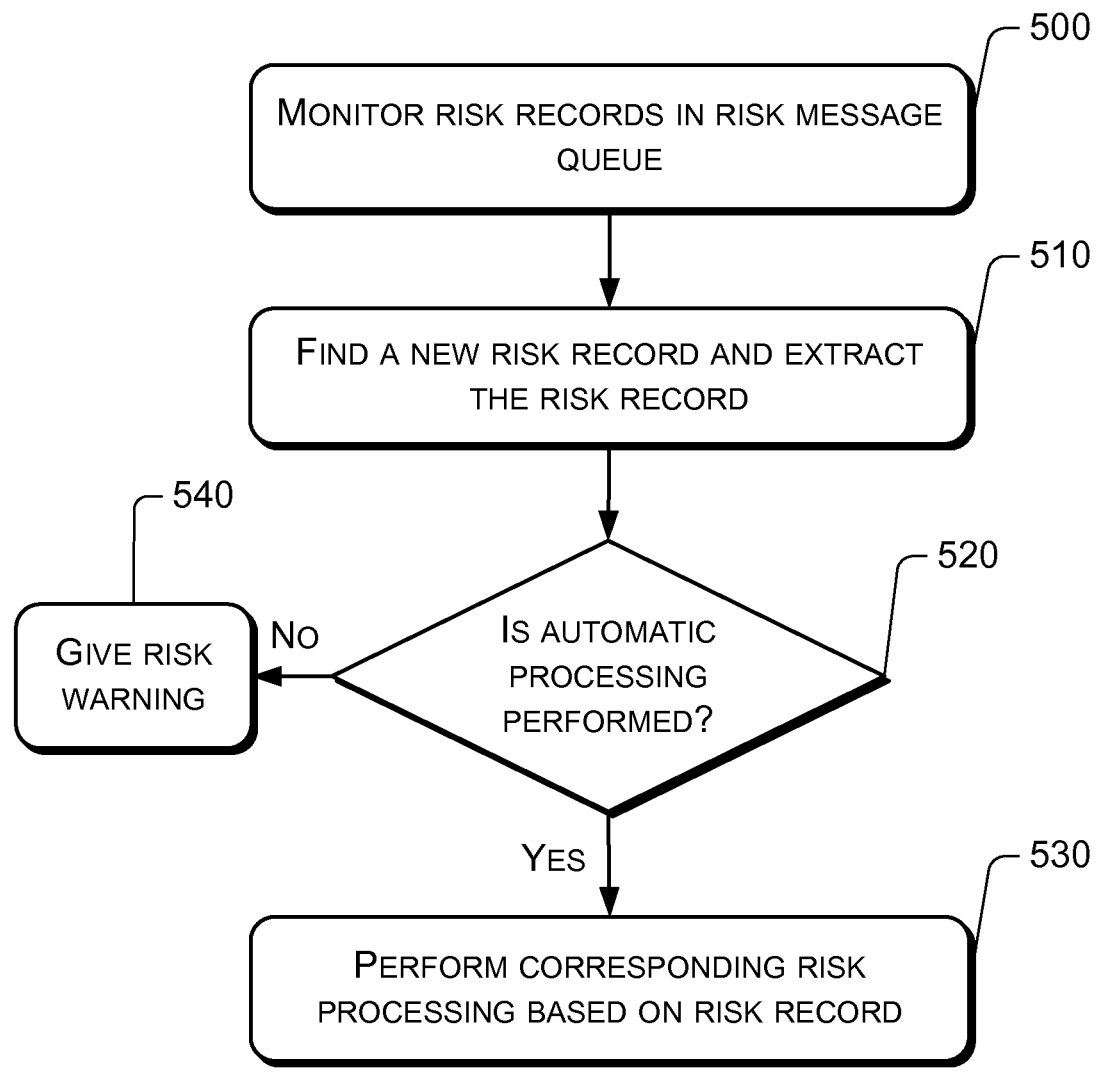
FIG. 5 shows a flow chart of risk processing in accordance with the exemplary embodiment of the present disclosure.

FIG. 5 shows a flow chart of risk processing, which is described as follows:

At Step 500, the risk monitor 230 monitors the risk message queue 243.

At Step 510, upon detecting a new risk record entering into the risk message queue 243, the risk monitor 230 fetches the risk record and sends the risk record to the risk analyzer 231. The risk message queue 243 then deletes the risk record.

At Step 520, based on a risk processing configuration and the risk record, the risk analyzer 231 determines whether an automatic processing should be performed. If yes, the process continues to Step 530. Otherwise, the process proceeds to Step 540.

At Step 530, the risk analyzer 231 selects the risk processor 232 according to the property of the risk record and sends the risk record to the risk processor 232 for corresponding risk processing.

At Step 540, the risk analyzer 231 gives a risk warning and allows an administrative person to process the risk.

An example of monitoring a fund withdrawal of a user in a business processing system is illustrated as follows:

For an online business processing system, a fund withdrawal operation of a user refers to the user transferring a fund from an account used for electronic business transaction to a personal account controlled by the user. The process of risk monitoring by a risk monitoring system is described as follows:

1. A user provides user identity information to an accounting system to apply for a fund withdrawal. The accounting system processes the fund withdrawal application of the user. Event collecting device 21 intercepts the fund withdrawal application, parameters of the user request (such as user ID), and business data created after the accounting system has processed the transaction, and subsequently generates an event object which includes:
   User ID: user A;
   Operation Time: 2006-01-10, AM 10:30;
   Customer Terminal IP Address: XXXX.XXXX.XXXX.XXXX;
   Customer Terminal MAC Address: aaaa;
   Server IP Address: YYYY.YYYY.YYYY.YYYY;
   Operation Type: fund withdrawal;
   Operation Object Identity: account serial number;
   Operation Content: 100 dollars.

2. The event collecting device 21 sends the event object to the event message queue 241. This event object needs to be saved because certain rules require all transaction activities of the account be examined within the past thirty days.

3. Upon detecting a new event object, the event monitor 220 fetches the event object and sends the event object to the event analyzer 221. The event message queue 241 then automatically deletes the event object.

4. Since this is a fund withdrawal operation, the fund of the user in the accounting system should be related to historical events such as a recharging event or a trade event. Therefore, one of the risk monitoring rules for analyzing the event object may require the fund withdrawal operation to be related to a previous trade event or a previous recharging event. The event analyzer 221 searches the event database 240 by the user ID to obtain historical events related to the user. In this exemplary embodiment, no historical event related to the user is found.

Since no historical event related to the fund withdrawal operation is found, the rule engine returns a result showing a risk monitoring rule violation.

5. The event analyzer 221 generates a risk record according to the analysis result of the risk monitoring rule violation, sends this risk record to the risk message queue 243 and saves the risk record into the risk database 242. The risk record includes:
   User ID: user A;
   Operation Time: 2006-01-10, AM 10:30;
   Customer Terminal IP Address: XXXX.XXXX.XXXX.XXXX;
   Customer Terminal MAC Address: aaaa;
   Server IP Address: YYYY.YYYY.YYYY.YYYY;
   Operation Type: fund withdrawal;
   Operation Object Identity: account serial number;
   Operation Content: 100 dollars;
   Risk Level: 20 (a larger number indicates a higher risk; determined according to the risk monitoring rule violated);
   Recommended Action: fund withdrawal fails;
   Optional Actions: freeze account, freeze balance;
   Risk Description: user has had no trade or recharging activities within the past twenty days, suggesting a possibility of illegal use of a stolen card.

6. The risk monitor 230 detects a new risk record, fetches the risk record and sends the risk record to the risk analyzer 231. The risk message queue 243 then automatically deletes the risk record.

7. A risk processing configuration stipulates that a fund withdrawal operation having a risk be processed automatically by the system. The configuration stipulates that a certain (XX) risk processor 232 is used for processing a risk record that has a risk level greater than 10 and a processing action impact level smaller than 20.

According to the risk processing configuration and the operation type (which is fund withdrawal operation) in the risk record, the risk analyzer 231 determines that automatic processing by system should be used, selects the XX risk processor 232 and sends the risk record to the XX risk processor 232.

8. The XX risk processor 232 previous the user account and invalidates the fund withdrawal operation according to the related information in the risk record. Furthermore, the XX risk processor 232 provides a related hint message regarding the present risk processing.

The above exemplary embodiment of monitoring a fund withdrawal operation is only used to illustrate the present disclosure. The information in the event object and the risk record is for an illustration purpose only. An actual application may omit some of the information, but may also have additional information. The risk monitoring of other business operations is similar to the above exemplary embodiment and will not be repeated here.

Evidently, a technician in the art can alter or modify the disclosed embodiments in many different ways without departing from the spirit and the scope of the present disclosure. Accordingly, it is intended that the present disclosure covers all modifications and variations which fall within the scope of the claims of the present disclosure and their equivalents.

The invention claimed is:

1. A method comprising:
Intercepting parameters of an instant user request that is provided to a processing system, wherein intercepting the parameters is performed independently to the instant user request being provided to the processing system;
Intercepting data generated by the processing system initially processing an instant transaction;
Packing the parameters of the instant user request and the data into an event object;
Analyzing the event object according to risk monitoring rules independently to the processing system processing the instant transaction, analyzing the event object comprising
Providing the event object to a rule engine which is used for analyzing risks according to the risk monitoring rules;
returning a processing result of the instant transaction responsive to the user instant request without waiting for a completion of the analyzing of the event object, wherein analyzing the event object is asynchronous with processing the instant transaction by the processing system;
generating a risk record responsive to determining that a risk exists through the analyzing the event object, the risk record comprising a user IP address and a server IP address;
Processing a risk of the risk record; and
Invalidating the instant transaction based at least in part on the processing of the risk of the risk record.

2. The method as recited in claim 1, wherein analyzing the event object according to the risk monitoring rules further includes:
Searching a storage system for related historical events;
Creating an event context using the related historical events; and
Analyzing the event object based at least in part on the event context.

3. The method as recited in claim 1, wherein the intercepting parameters of the instant user request, the intercepting the data, and the packing the parameters of the instant user request and the data into the event object are performed asynchronously from the analyzing the event object.

4. The method as recited in claim 1, wherein processing the risk comprises at least one of performing automatic processing or providing warning notification.

5. The method as recited in claim 4, further comprising, responsive to the performing automatic processing, determining an executing object for processing the risk, and sending the risk record to the executing object.

6. A method comprising:
Intercepting parameters of an instant user request and data generated by a processing system initially processing an instant transaction, wherein intercepting the parameters and the data is performed independently to the instant user request being provided to the processing system;
Packing the parameters of the instant user request and the data into an event object;
Analyzing the event object using preset risk monitoring rules and the event context;
generating a risk record responsive to a determination that a risk exists in the event object, the risk record comprising a user IP address and a server IP address;
returning a processing result of the instant transaction responsive to the user instant request without waiting for a completion of the analyzing of the event object, wherein analyzing the event object is asynchronous with processing the instant transaction by the processing system;
Processing the risk of the event object according to a risk processing mode; and
Invalidating the instant transaction based at least in part on the processing of the risk of the event object.

7. The method as recited in claim 6, further comprising storing the preset risk monitoring rules.

8. The method as recited in claim 7, further comprising calling the preset risk monitoring rules in analyzing the risk of the event object.

9. A method comprising:
intercepting an instant user request message entering a processing system, the intercepted instant user request message being for a requested operational event to be processed by the processing system, intercepting the instant user request message being performed independently to the instant user request message being provided to the processing system;
Intercepting, from the processing system, at least one portion of transaction data;
generating an event object based at least on the intercepted instant user request message and the at least one portion of the transaction data, the event object being packed with at least user parameters of the instant user request message and the at least one portion of the transaction data;
Analyzing the event object based at least on risk monitoring rules and determining a risk level for the requested operational event;
returning a processing result of the requested operational event responsive to the user instant request message without waiting for a completion of the analyzing of the event object, wherein analyzing the event object is asynchronous with processing the requested operational event by the processing system;
Generating a risk record that includes a user IP address and a server IP address;
Processing a risk of an instant transaction corresponding to the requested operational event according to the risk record; and
Invalidating the instant transaction based at least in part on the processing of the risk of the instant transaction.

10. The method as recited in claim 9, further comprising: determining the risk level in accordance with risk monitoring rules.

11. The method as recited in claim 10, further comprising: determining whether too automatically or manually process the requested operational event based at least on the risk level.

12. The method as recited in claim 9, further comprising:
  searching a historical event database, based at least on at least one user parameter, for historical events related to the requested operational event; and
  Retrieving a number of related historical events from the historical event database.

13. The method as recited in claim 12, wherein in a case where the number of related historical events retrieved from the historical event database is zero, the method further comprises: indicating in the risk record a risk monitoring rule violation indicative of zero related historical events.

\* \* \* \* \*